Sept. 14, 1954     L. U. EYERLY     2,689,126
GEAR-DRIVEN CONTROL FOR FERRIS WHEEL CARS
Filed July 26, 1950
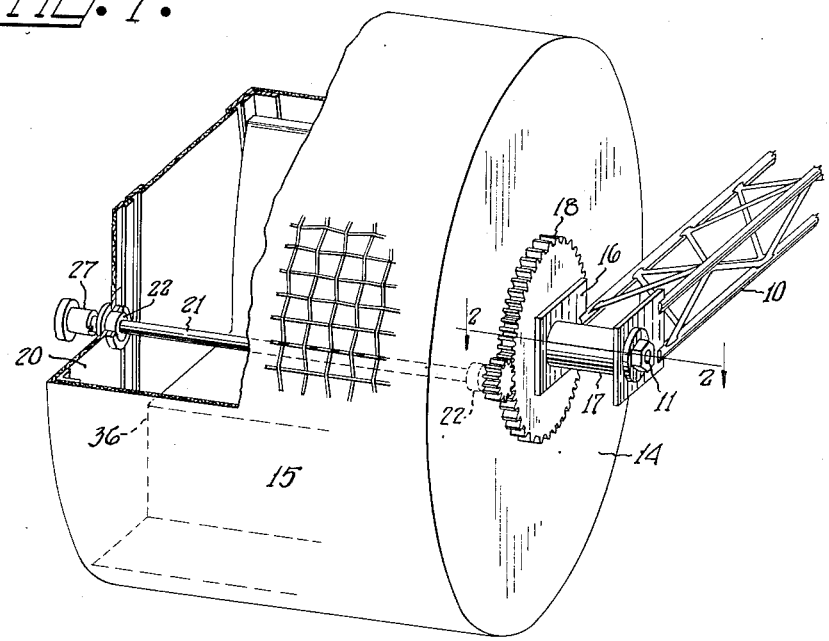
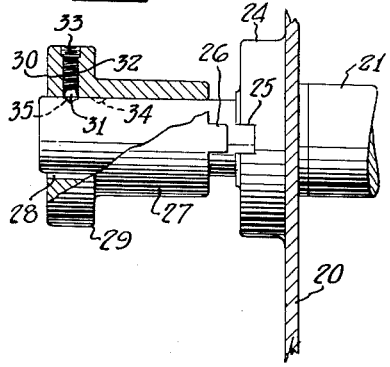
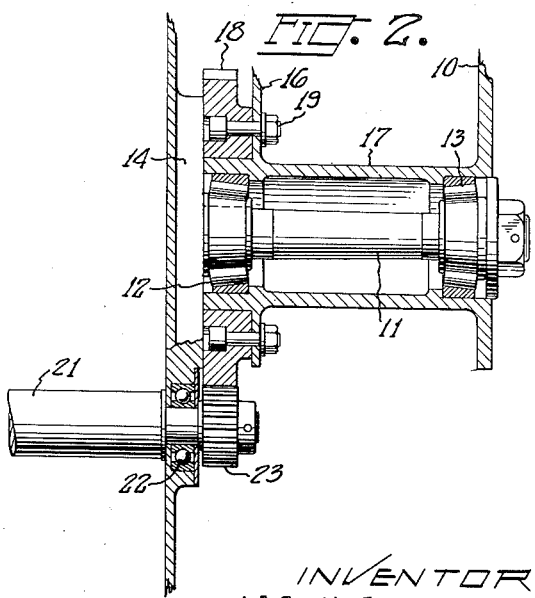
INVENTOR
LEE U. EYERLY
BY
ATTORNEY Patented Sept. 14, 1954

2,689,126

UNITED STATES PATENT OFFICE 2,689,126

GEAR-DRIVEN CONTROL FOR FERRIS WHEEL CARS

Lee U. Eyerly, Salem, Oreg.

Application July 26, 1950, Serial No. 175,984

1 Claim. (Cl. 272—38)

This invention relates generally to amusement rides, particularly of the type set forth in my co-pending application, Serial No. 23,171, now abandoned.

The main object of this invention is to provide a ride of the Ferris wheel type with a gear retarder or control for the position of the car in which the rider is seated.

The second object is to provide a device which is more fool proof than is the ordinary frictionally controlled car.

The third object is to construct a control of the class described in a manner that it will not be improperly operated should the rider become excited or too playful.

I accomplish these and other objects in the manner set forth in the following specification as illustrated in the accompanying drawing, in which:

Fig. 1 is a perspective view of the car with a part broken away to show the mechanism.

Fig. 2 is a fragmentary section taken along the line 2—2 in Fig. 1.

Fig. 3 is a fragmentary sectional view through the clutch for locking the car stationary.

Like numbers of reference refer to the same or similar parts throughout the several views.

Referring in detail to the drawing there is shown a supporting arm 10 constituting a spoke in a common form of Ferris wheel (not shown). Mounted on the arm 10 is a car supporting shaft 11 provided with anti-friction bearings 12 and 13.

Secured to the shaft 11 is the side 14 of a cylindrical car 15. Secured to the plate 16 which forms a flange on the shaft housing 17 is a gear 18 which is held by the bolts 19.

Journalling across the sides 14 and 20 is a shaft 21 which is mounted in the anti-friction bearings 22 and has secured on one end a pinion 23 which meshes with a gear 18 at all times.

On the side 20 is formed a hub 24, in which is formed a notch 25 adapted to receive the jaw 26 of the sleeve 27 which is slidably mounted on the shaft 21 by means of a spline 28. On the sleeve 27 is formed a flange 29 having a radial hole 30 formed therein which contains a ball 31 and a spring 32 held in place by the screw 33.

Notches 34 and 35 are formed in the shaft 21 to enable the sleeve 27 to be held in a position to lock the shaft 11 with relation to the arm 10 or to permit it to rotate.

The operation of the device is as follows: Assuming that a passenger is seated on the seat 36 and the Ferris wheel is put in motion causing the arm 10 to swing in a circular orbit in a vertical plane, it follows that if the jaw 26 engages the notch 25, the shaft 21 will be held against rotation and the car 15 will be locked with relation to the arm 10. If, however, the sleeve 27 is withdrawn, as shown in Fig. 3, then gravity will hold the car 15 in an upright position causing the shaft 21 to rotate as the car 15 moves around in its orbit. In this rotation, the passenger is in an upright position at all times. If, however, the passenger desires some additional thrills, he holds the shaft 21 in his hands and completely or partially prevents the rotation of the shaft 21, causing the resulting action to impart a rotary movement to the car 15. The instant he releases his hold on the shaft 21, the car 15 returns to an upright position thereby making the device extremely safe for novices and those who are otherwise easily excited.

It is a well known fact that devices have been made in which cars were driven with relation to the wheel or frictionally held in a driving relation thereto, but such devices have proved more or less dangerous and it is to overcome this objection that I have provided a gear control for the car position and this forms the basis of my invention.

I claim:

In an amusement device of the class described the combination of a Ferris wheel arm having a cage supporting shaft rotatably mounted in the outer end thereof, a gear non-rotatably secured to said arm concentric with said shaft, a cage supported by said shaft, a control shaft journalling in said cage and projecting from opposite ends thereof, a pinion on one end of said control shaft meshing with said gear and means on the opposite end of said control shaft for releasably locking said control shaft against rotation with relation to said cage, said locking means being external of said cage.

References Cited in the file of this patent

UNITED STATES PATENTS

| Number | Name | Date |
|---|---|---|
| 1,557,942 | Matthews | Oct. 20, 1925 |
| 1,640,038 | Johnson | Aug. 23, 1927 |
| 2,046,678 | Eyerly | July 7, 1936 |
| 2,158,073 | Keith et al. | May 16, 1939 |
| 2,229,966 | Eyerly | Jan. 28, 1941 |
| 2,535,862 | Pewitt | Dec. 26, 1950 |
| 2,559,768 | Howard | July 10, 1951 |